US006439807B1

(12) United States Patent
Wijsman (10) Patent No.: US 6,439,807 B1
(45) Date of Patent: Aug. 27, 2002

(54) METHOD AND APPARATUS FOR UNDERWATER CONNECTION OF PIPE PIECES AND BOLT THEREFOR

(75) Inventor: Jacobus Cornelis Wijsman, Rijnsburg (NL)

(73) Assignee: Allseas Group S.A. (CH)

( * ) Notice: Subject to any disclaimer, the term of this patent is extended or adjusted under 35 U.S.C. 154(b) by 0 days.

(21) Appl. No.: 09/065,123

(22) Filed: Apr. 23, 1998

(30) Foreign Application Priority Data

Apr. 24, 1997 (NL) .............................................. 1005891

(51) Int. Cl.[7] .............................. F16L 1/16; F16L 1/26; B25B 13/28
(52) U.S. Cl. ....................................... 405/170; 81/57.36
(58) Field of Search ................................ 405/170, 171, 405/169, 172, 158, 161, 160, 191, 190, 188; 81/57.22, 57.36

(56) References Cited

U.S. PATENT DOCUMENTS

| | | | | |
|---|---|---|---|---|
| 3,166,123 A | * | 1/1965 | Watkins ................... | 405/191 X |
| 4,030,309 A | * | 6/1977 | Mason ........................ | 405/190 |
| 4,203,687 A | * | 5/1980 | Sumner ....................... | 405/170 |
| 4,234,268 A | * | 11/1980 | Scodino .................. | 405/173 X |
| 4,542,576 A | * | 9/1985 | Yamanaga et al. ...... | 81/57.22 X |
| 4,581,812 A | * | 4/1986 | Yamanaga et al. ...... | 81/57.22 X |
| 4,832,530 A | * | 5/1989 | Andersen et al. ........... | 405/170 |
| 5,004,017 A | * | 4/1991 | White ..................... | 405/170 X |
| 5,277,085 A | * | 1/1994 | Tanimura et al. ........... | 81/57.22 |
| 5,406,596 A | * | 4/1995 | Malmasson ............ | 81/57.36 X |
| 5,458,439 A | * | 10/1995 | Hall et al. .............. | 405/169 X |
| 5,593,249 A | * | 1/1997 | Cox et al. ............... | 405/170 X |
| 5,730,551 A | * | 3/1998 | Skeels et al. ........... | 405/170 X |
| 5,740,703 A | * | 4/1998 | Perry .................... | 81/57.36 X |

FOREIGN PATENT DOCUMENTS

GB        2040012 A   *  8/1980   .................. 405/170

* cited by examiner

Primary Examiner—David Bagnell
Assistant Examiner—Tara L. Mayo
(74) Attorney, Agent, or Firm—Mark Zovko

(57) ABSTRACT

A method and apparatus for connecting two pieces of pipe having flanges when the pipe pieces are located deep under a water surface. A movable bolt wrench is provided which has a number of wrenches mounted in a frame corresponding to the bolt holes on the flanges of the pipe pieces. Bolts located in the bolt wrenches are aligned with the bolt holes of the flanges and inserted into the bolt holes. A nut wrench is also provided containing nuts which, when aligned, are threaded onto the ends of the bolts associated with the bolt wrench. After the bolt and nut connections are made, these bolts and nuts are tightened by the operation of the bolt and nut wrenches.

6 Claims, 13 Drawing Sheets

METHOD AND APPARATUS FOR UNDERWATER CONNECTION OF PIPE PIECES AND BOLT THEREFOR

BRIEF SUMMARY OF THE INVENTION

In order to enable the realization of nut and bolt connections, in particular deep under the water surface, the invention provides a method herein described in addition to an apparatus also herein described. The invention also provides a bolt designed specially for the application of the invented method.

DETAILED DESCRIPTION OF THE INVENTION

Figure 1:
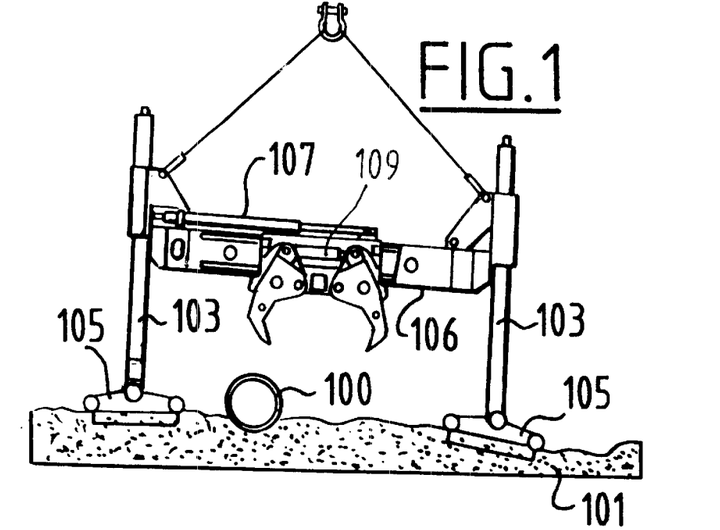
FIGS. 1–8 show successive steps of the underwater displacement of a pipe piece.
Figure 2:
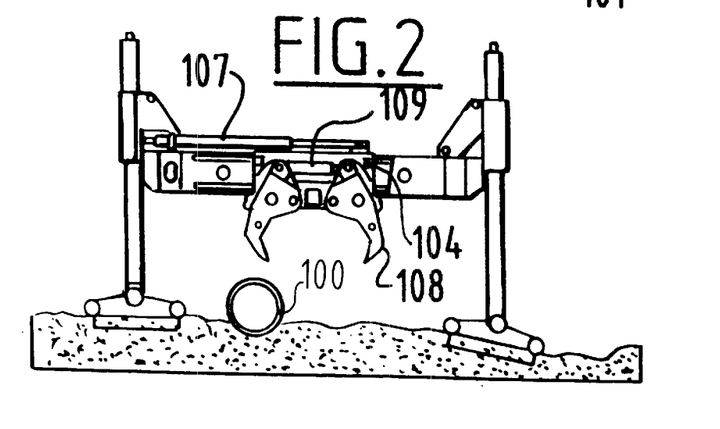
Figure 3:
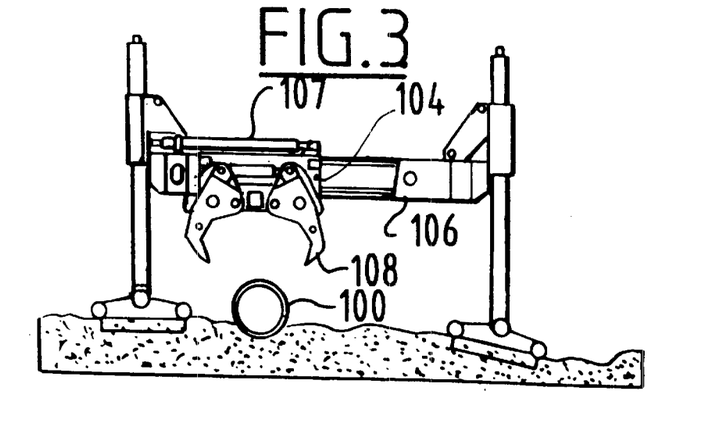
Figure 4:
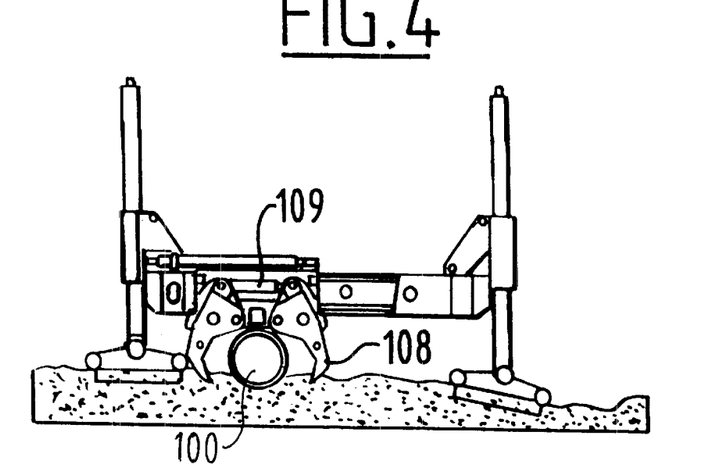
Figure 5:
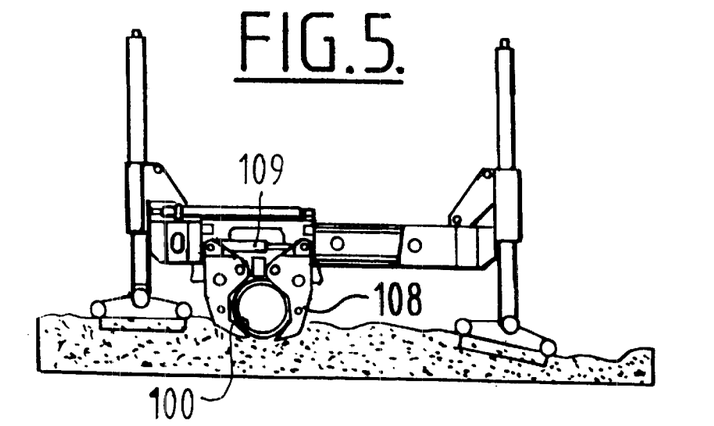
Figure 6:
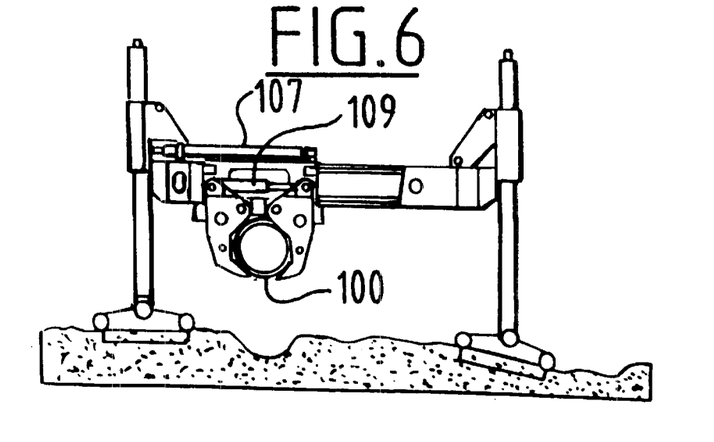
Figure 7:
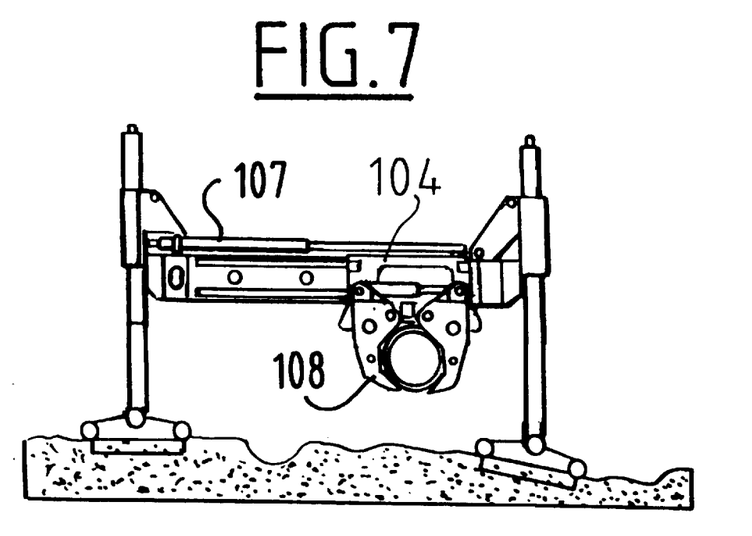
Figure 8:
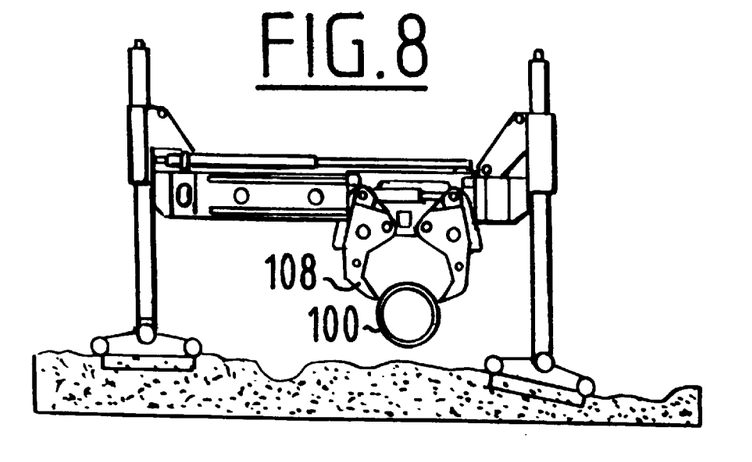

In the method according to the invention, for instance two pipe pieces 100 which lie on a seabed 101 at a depth of for instance 1 km are displaced by means of yokes 106 (FIGS. 1–8) such that they come to lie mutually in line and mutually connect with their flanges 102. One yoke 106 at a time is herein placed horizontally by means of its telescopic legs 103 provided with pivoting feet 105 (FIGS. 1, 2). A gripper frame 104 is displaced in transverse direction of pipe pieces 100 relative to yoke 106 by means of hydraulic cylinders 107 to a position above a pipe piece 100. Then the yoke 106 is moved downward, a gripper 108 supported by gripper frame 104 is closed round pipe piece 100 by means of a cylinder 109 and yoke 106 with pipe piece 100 is raised, whereafter pipe piece 100 is displaced.

Figure 9:
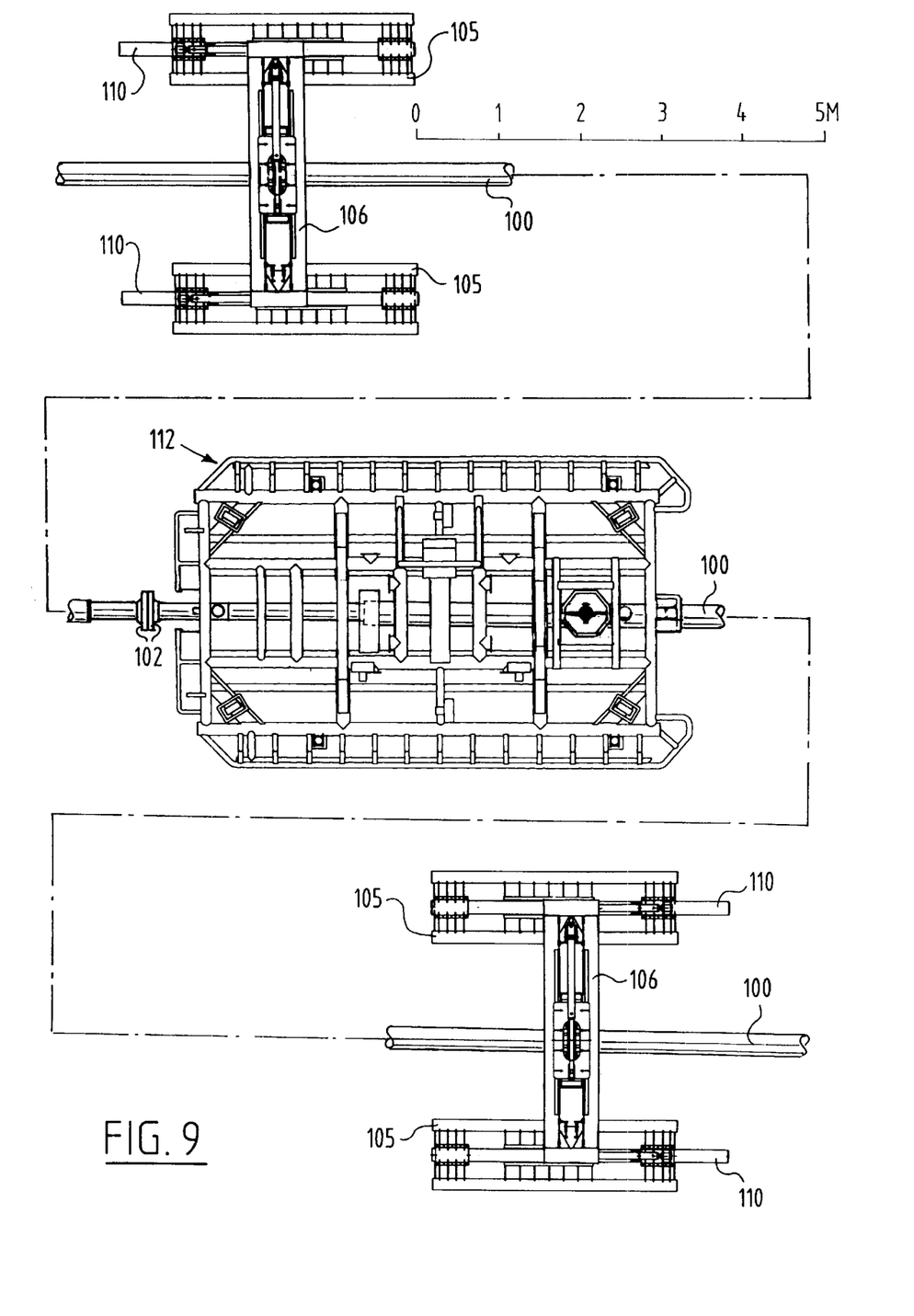
FIGS. 9 and 10 show respectively a top and side view of an apparatus according to the invention.

These operations can be repeated, optionally while yoke 106 is moved in longitudinal direction of feet 105 and pipe piece 100 by means of hydraulic cylinders 110 (FIG. 9).

Figure 10:
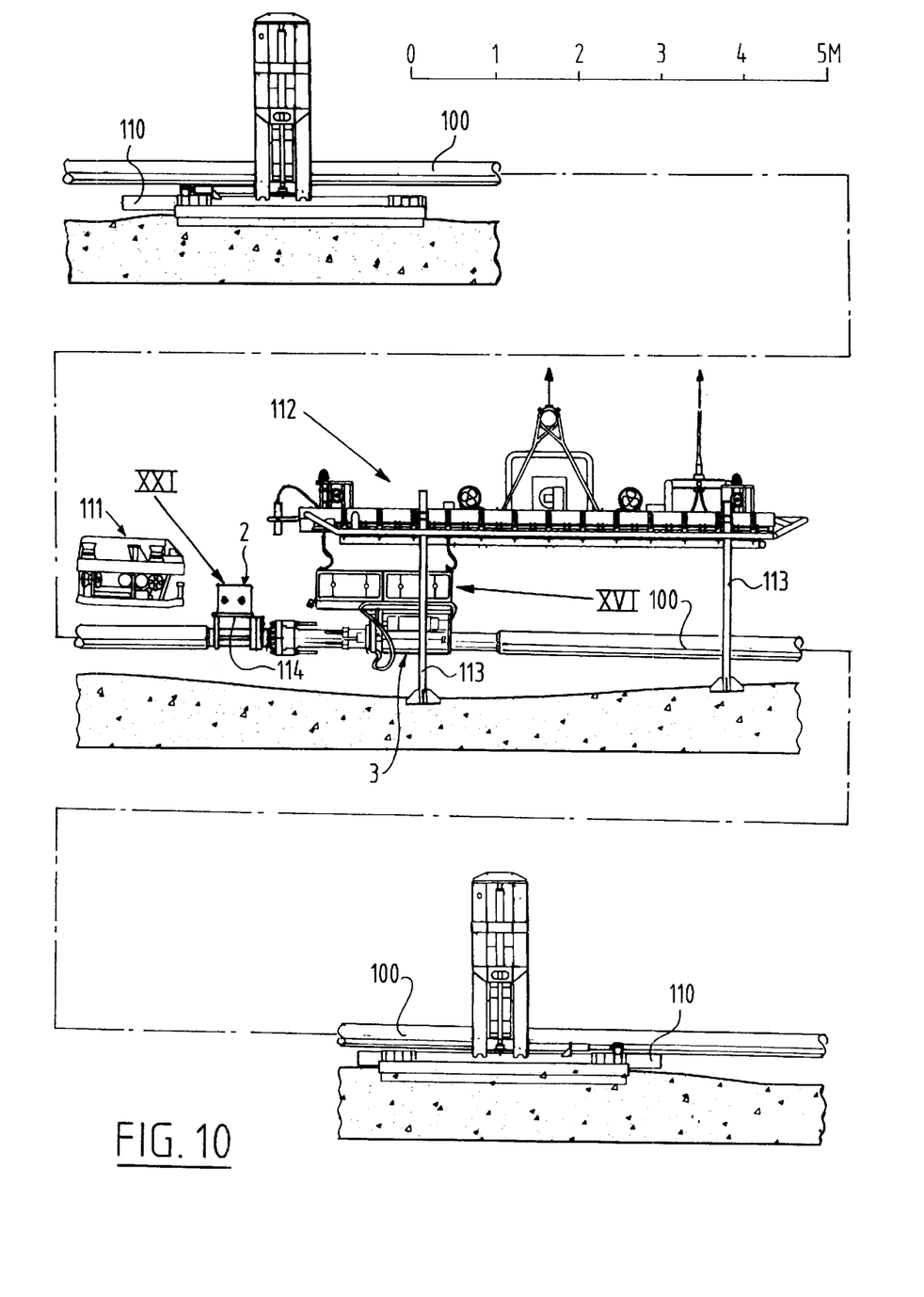

When pipe pieces 100 lie mutually in line, which is controlled from a Remote Operated Vehicle (ROV) 111 (FIG. 10), a positioning frame 112 lowered from a ship is placed above a pipe piece 100 on legs 113. Positioning frame 112 transports a nut wrench 2 and a bolt wrench 3 which are placed on pipe pieces 100. Positioning frame 112 further carries pump means for hydraulic fluid for driving the diverse hydraulic motors of wrenches 2 and 3.

Figure 11:
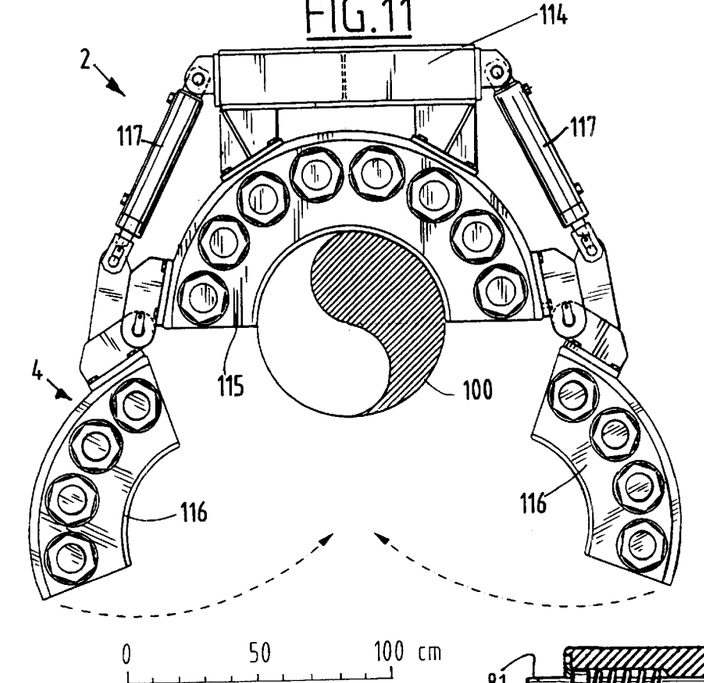
FIG. 11 shows a nut magazine.
Figure 18:
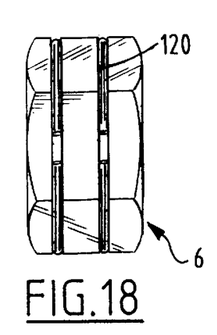
FIGS. 18 and 19 show views of partial exploded views of FIG. 14 showing the area labeled XIX of FIG. 14.

Nut wrench 2 comprises an upper half 115 of a nut magazine 4 which is fixedly mounted on a wrench frame 114 and from which two lower quarters 116 are suspended by means of cylinders 117 for swivelling between the opened position of FIG. 11 and a closed position engaging round a pipe piece 100. Wrench frame 114 is supported on a pipe piece 100 via a saddle 118. Nut magazine 4 has for instance 16 compartments 5 distributed over the periphery and having a hexagonal profile, in each of which compartments is received one nut 6 which is urged outward by a spring 119 but which is held so rigidly in its closely dimensioned compartment 5 by means of rubber friction rings 120 (FIGS. 18, 19) that spring 119 cannot overcome this friction.

Figure 16:
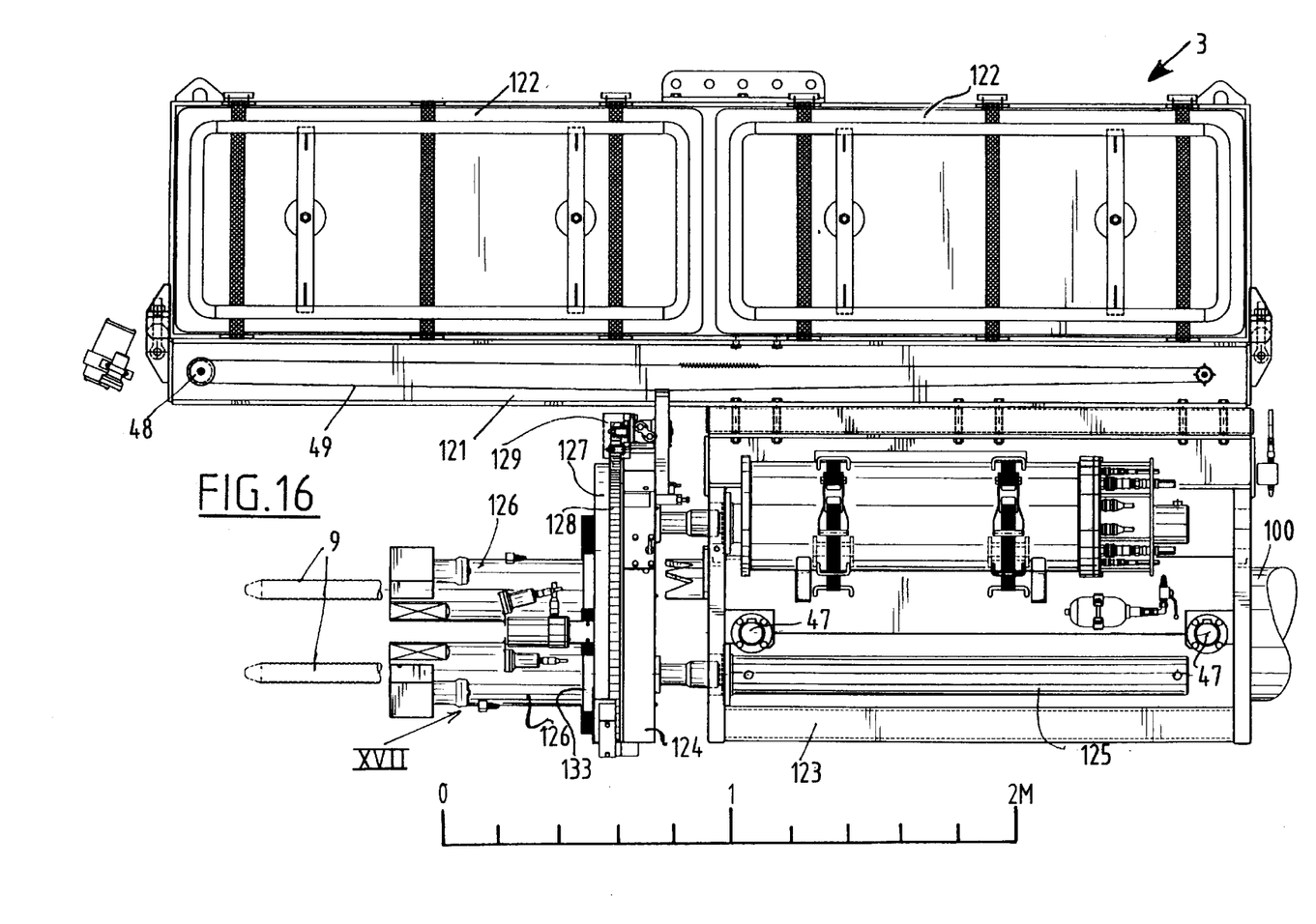
FIG. 16 shows a partial exploded view of FIG. 10 showing the area labeled XVI of FIG. 10.

The bolt wrench 3 (FIG. 16) comprises a wrench frame 121 which is provided with floater bodies 122 and which is lowered onto a pipe piece 100 by means of a saddle 123. A saddle-shaped supporting head 124 is slidable in axial direction relative to saddle 123 by means of hydraulic cylinders 125. Saddle 123 can be anchored to a pipe piece 100 by means of hydraulically energized transverse pins 47. A frame 133 mounted to supporting head 124 by means of a ring bearing 127 is rotated into an angular position by means of a gear ring 128 and driving gear 129 such that four wrenches 30 mounted on frame 126 and disposed in each case at mutual angular distances of 900 are situated opposite bolt holes 8 of flanges 102. The supporting head 124 is then displaced relative to wrench frame 121 until the bolts 9 protrude into bolt holes 8. Displacing of supporting head 124 is measured by means of a wire 49 trained round a pick-up 48. In order to place bolt holes 8 of flanges 102 in line, the pipe pieces 100 are optionally twisted slightly by pivoting the yokes 106 (in which pipe pieces 100 are held) relative to each other using pipe pieces 100 as pivot axis.

Figure 14:
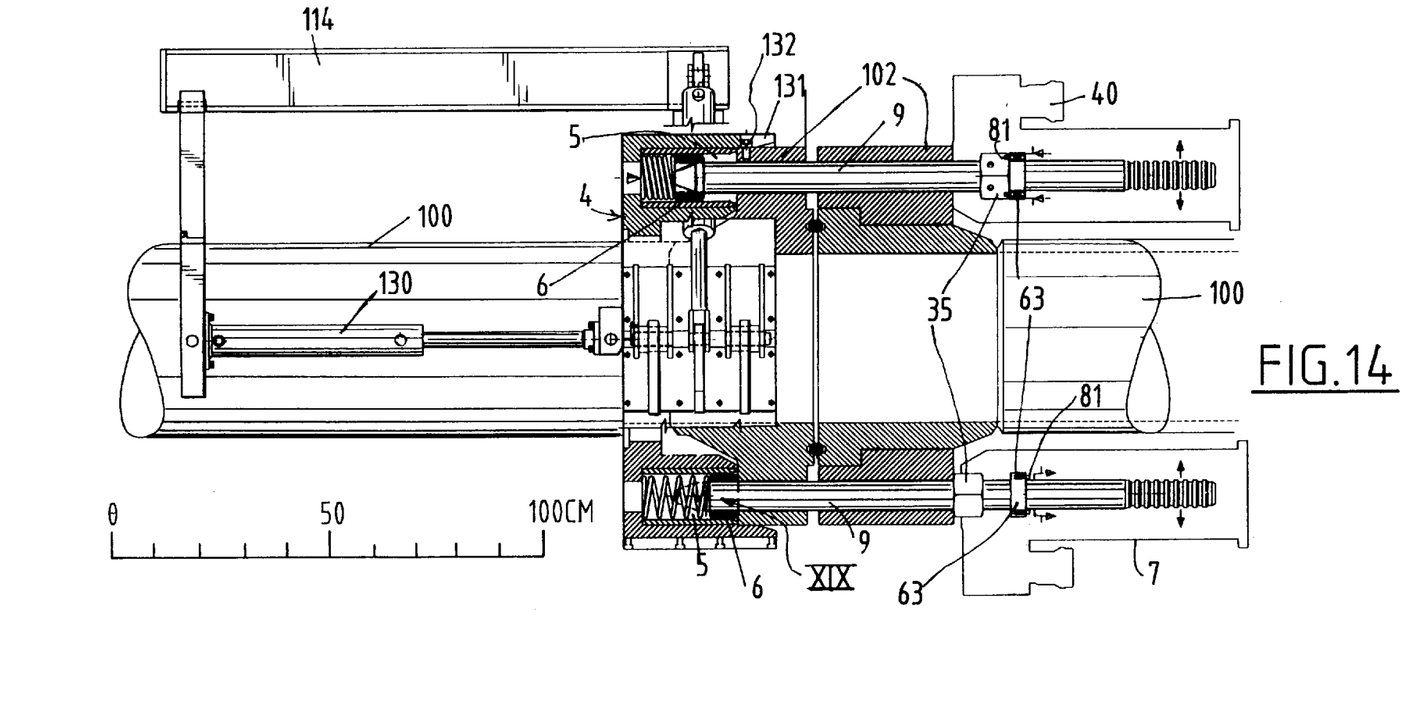
Figure 15:
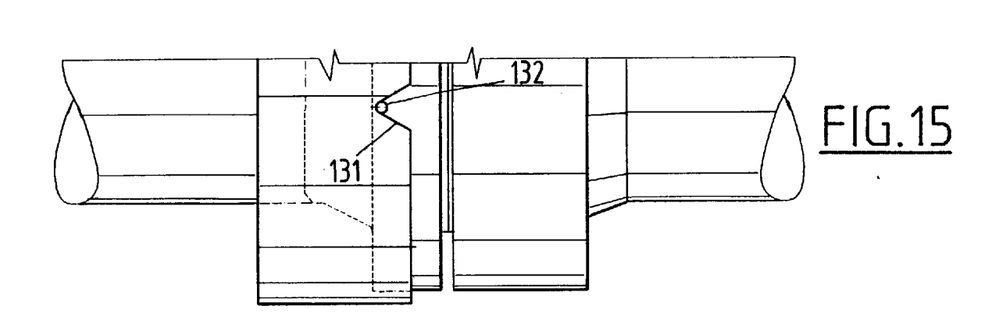

Together with wrench frame 114, nut magazine 4 is moved relative to saddle 118 toward bolts 8 by means of hydraulic cylinders 130 (FIGS. 14, 15) until a positioning cavity 131 of nut magazine 4 strikes against a positioning pin 132 of a flange 102. The compartments 5 with nuts 6 are hereby centered relative to bolt holes 8. Bolts 9 drive nuts 6 inside counter to spring action, whereby the friction of rings 120 is overcome.

Figure 17:
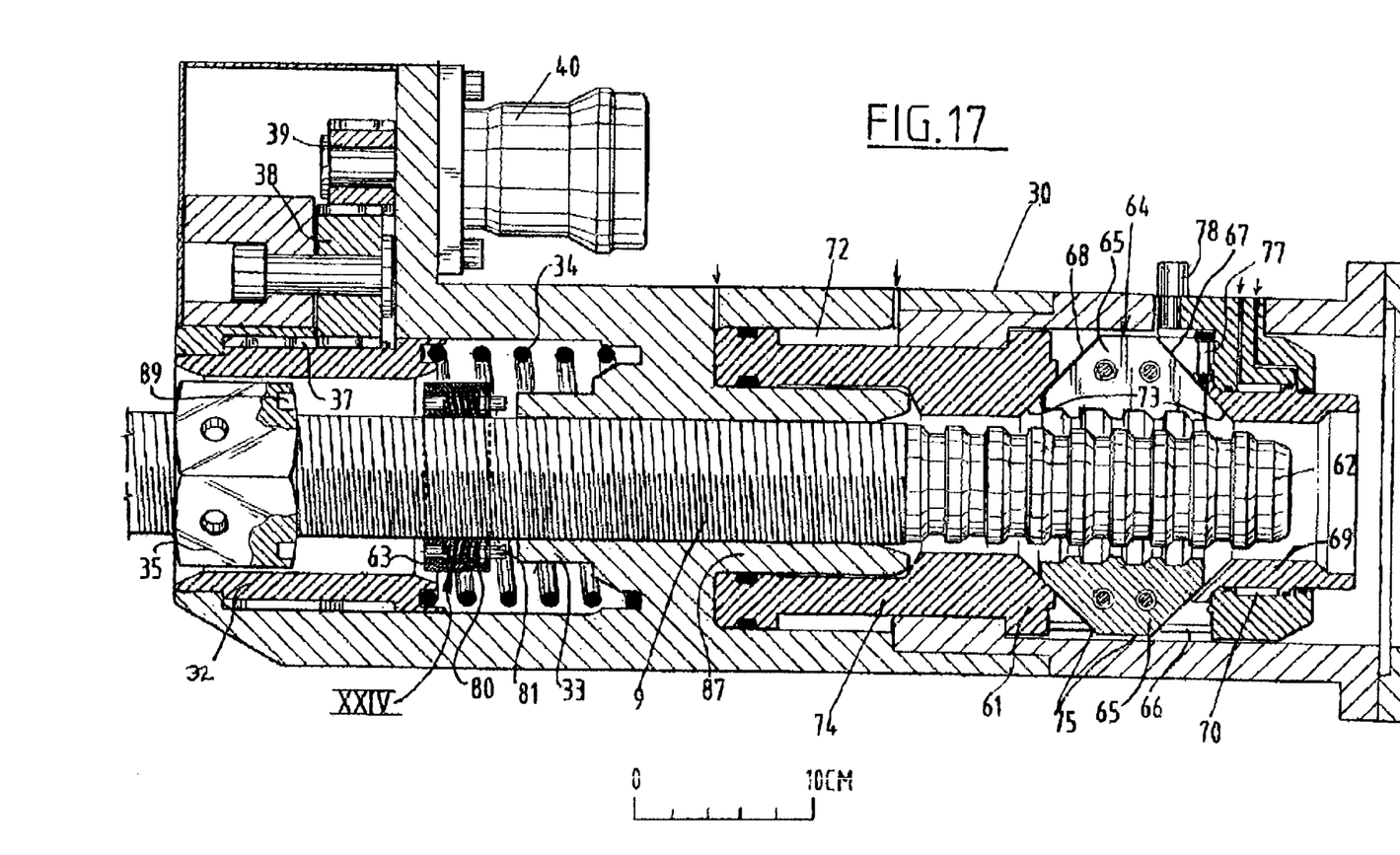
FIG. 17 shows a partial exploded sectional view of FIG. 16 showing the area labeled XVII of FIG. 16.

Each wrench 30 comprises in a housing 7 a socket 32 which is urged by means of a spring 34 into the position shown in FIG. 17 on a nut 35 and which is driven by a hydromotor 40 via its gear ring 37 and toothed wheels 38, 39. Each screw bolt 9 has a protruding grooved end 62 and a fixed ring 63 at a small distance from nut 35. Present is FIG. 17 at the free end of the grooved end 62 is a welded clamp 64 consisting of a number of, for instance three, clamping pieces 65 which have conical surfaces 67 and 68. Surfaces 67 co-act with the conical surface 73 of a piston 69 of a double-action cylinder 70 which is fixed by means of bolts 66 to a piston piece 61. Surfaces 68 co-act with a conical surface 73 of the piston piece 61 of piston 74 of a hydraulic, double-action cylinder 72. Clamping pieces 65 are urged apart by tangential pressure springs 75 arranged in each case in each separating surface.

Piston 69 carries a bolt 77 which in the clamping position of clamping pieces 65 (also the clamping position of piston 69) lies opposite an electrical sensor 78 mounted on cylinder 70 and thus indicates the clamping position.

Figures 19, 24:
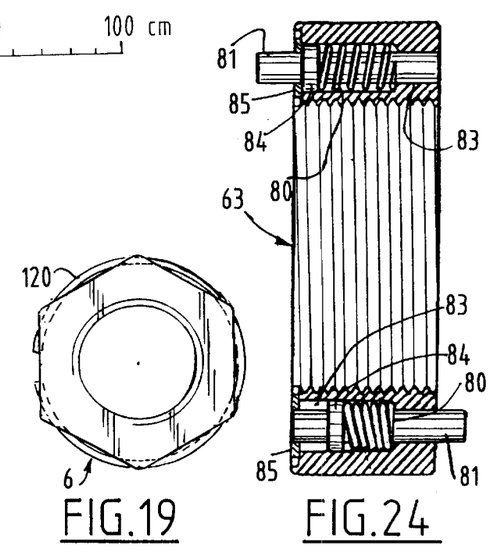
FIG. 24 shows a partial exploded view of FIG. 17 showing area XXIV of FIG. 17.

The ring 63 fixed for instance by glueing or locking comprises axial pins 81 which are urged away from nut 35 against stops 85 by springs 80 and received in continuous holes 83 and which, when energized by sliding sleeve 87 moves into arcuate recesses 89 of nut 35 (FIGS. 17, 24).

Piston 74 is sealed with at least one sealing ring relative to sliding sleeve 87 which is guided over threaded end 62 by means of a plastic lining 88.

Piston 74 is locked against rotation by means of axial rods 96.

During insertion of bolts 9 into flanges 102 (FIG. 12) the clamps 64 are closed and the pins 81 of fixed ring 63 engage into nut 35.

During arranging of nuts 6 (FIG. 14) clamps 64 are disengaged from bolts 9 and nuts 35 are driven by means of sockets 32 and motors 40 in order to rotate the bolts 9 which are coupled to nuts 35 via pins 81 and fixed rings 63 and thus screw them into the nuts 6.

When nuts 6 are screwed against a flange 102 the supporting head 124, and thus also housings 7, are moved away from flanges 102 by means of cylinders 125 so that the fixed rings 63 are moved away from nuts 35 and the disengaged nuts 35 move toward flanges 102 with further driving by motors 40.

While bolts 9 are held fast by clamps 64 and cylinders 72 are energized to place bolts 9 under axial tension, nuts 35 are driven by means of motors 40 in order to screw the flanges 102 firmly against each other.

After release of clamps 64 the bolt wrench 3 can be removed, four other bolts 9 can be placed therein by means of the ROV and these can be inserted into flanges 102 in a different angular position of ring bearing 127 relative to supporting head 124.

Figure 20:
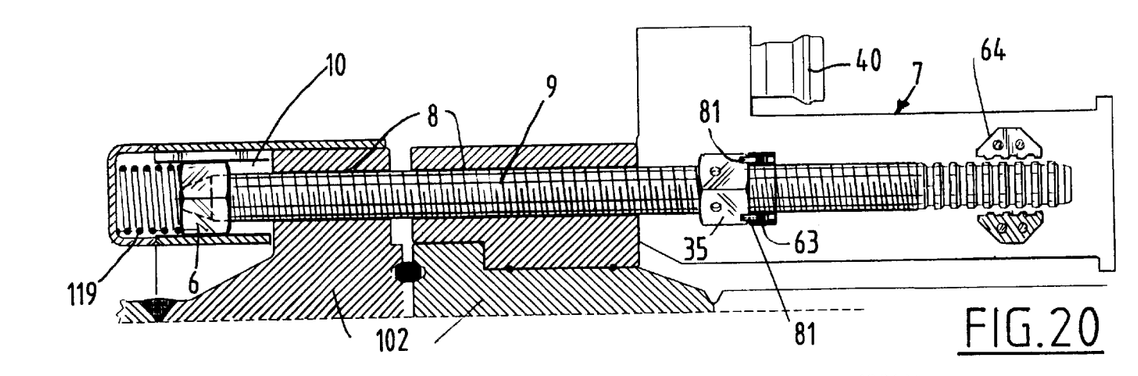
FIG. 20 shows a partial cross-sectional front view of a preferred embodiment of the apparatus of the present invention.

Instead of using a nut wrench 2 a flange 102 can be provided at each bolt hole 8 with a nut compartment 10 mounted thereon (FIG. 20) in which is situated a nut 6 urged toward flange 102 by a spring 119.

Although the described hydraulically driven clamp 64 is recommended, another, for instance mechanically driven, clamp can also be used.

Figure 12:
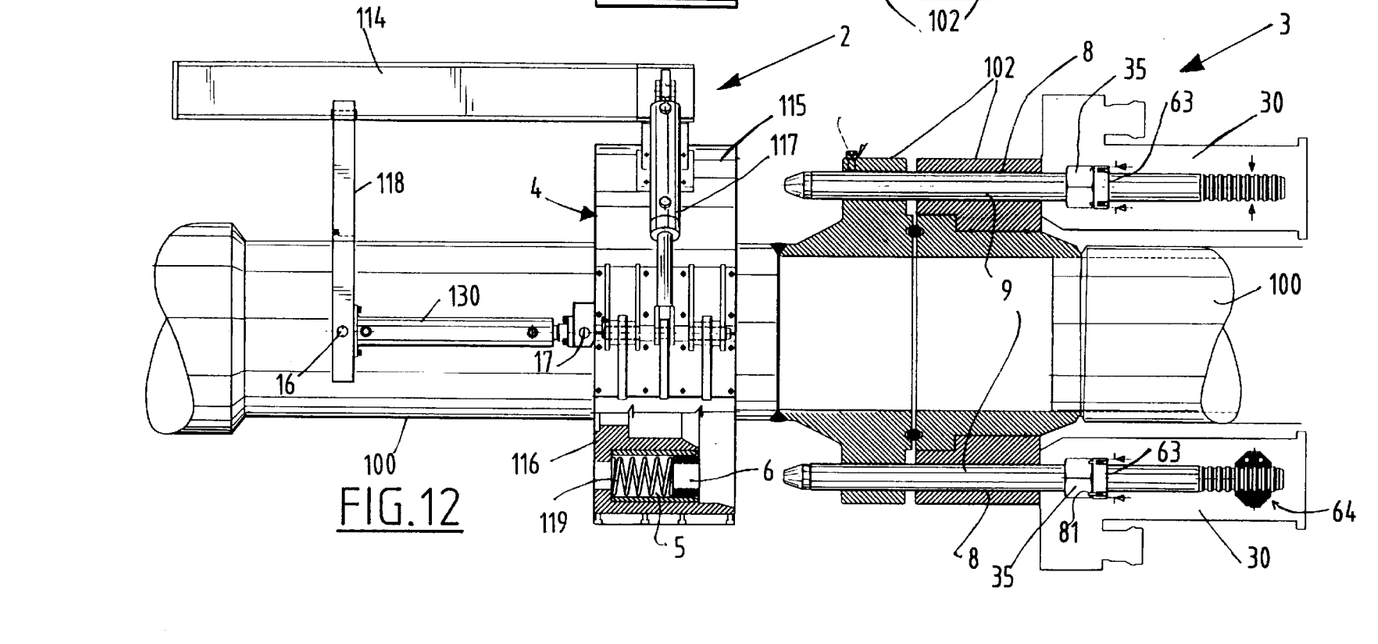
FIGS. 12 and 14 show side views of a preferred embodiment of the apparatus according to the invention in successive method steps.
Figure 13:
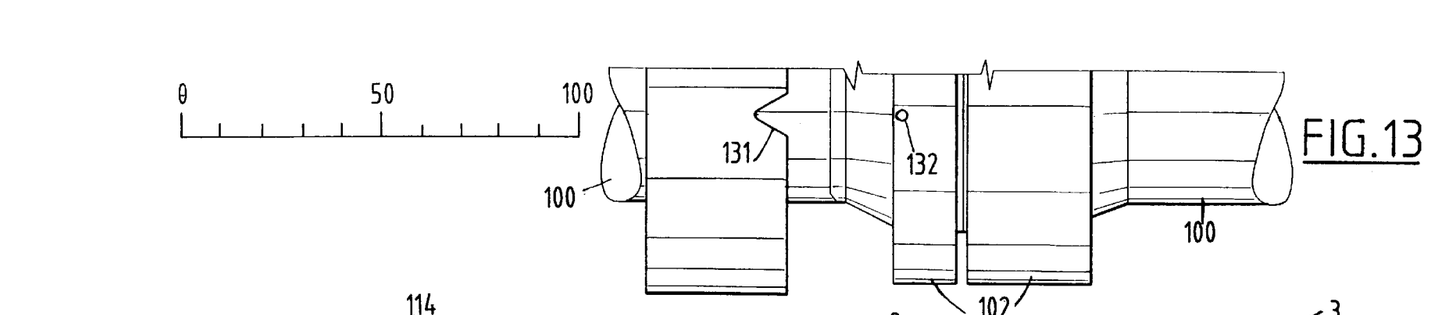
FIGS. 13 and 15 show a partial top view of FIGS. 12 and 14 respectively.
Figure 21:
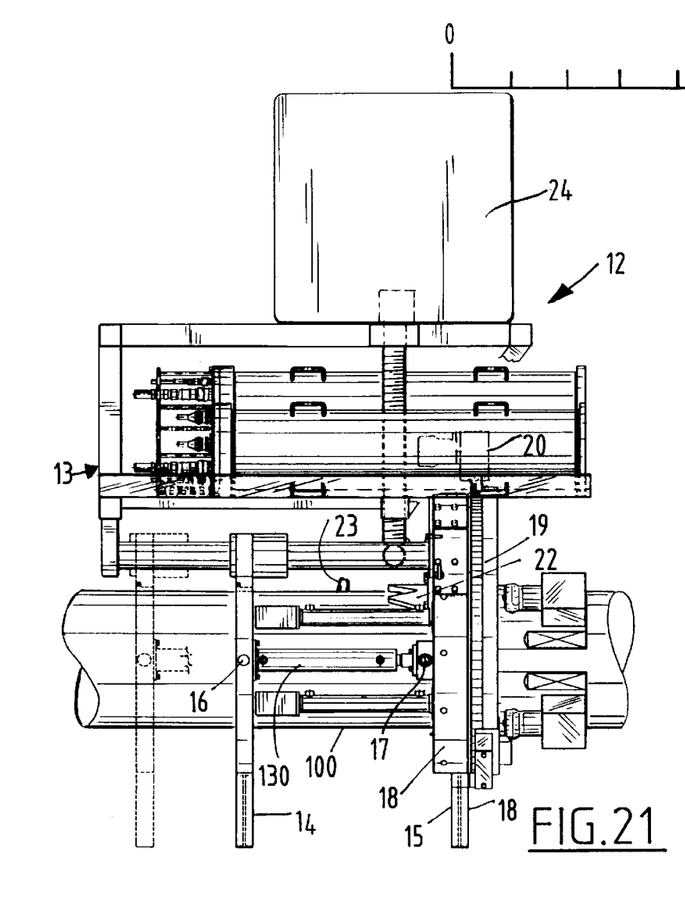
FIGS. 21 and 22 show an exploded partial elevation and side view of FIG. 10 showing area XXI of FIG. 10.
Figure 22:
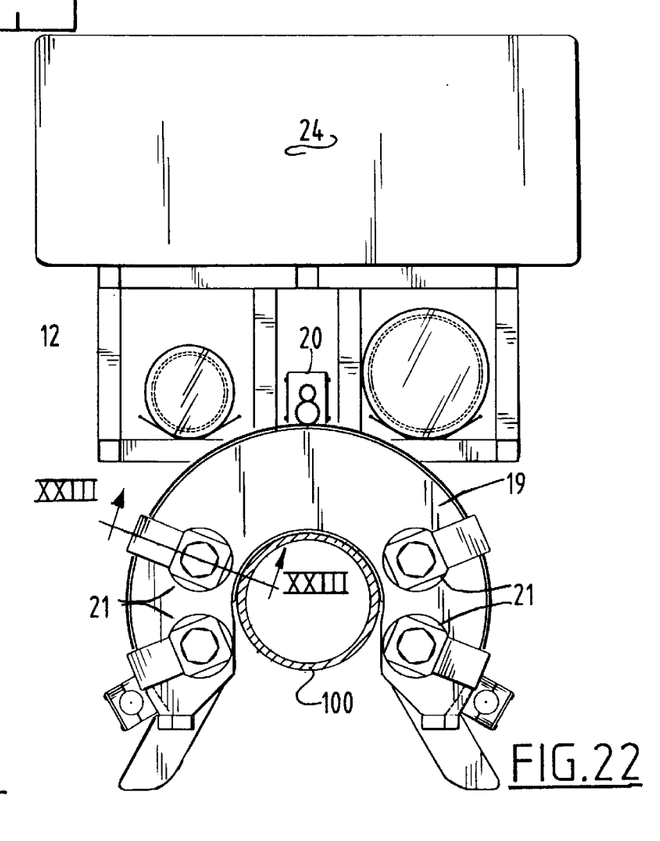
Figure 23:
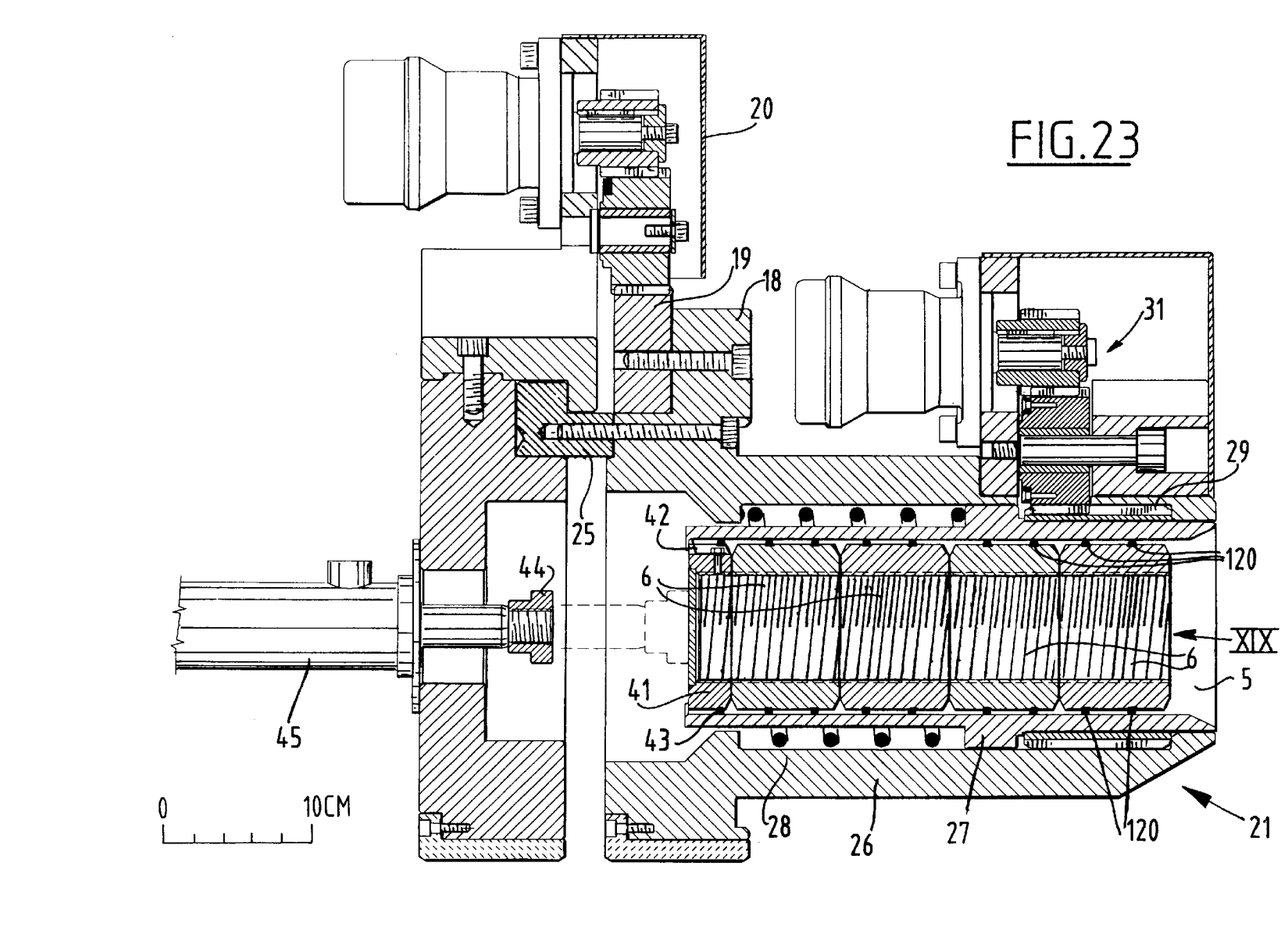
FIG. 23 shows a section along the line XXIII—XXIII of FIG. 22 on larger scale.
Figure 25:
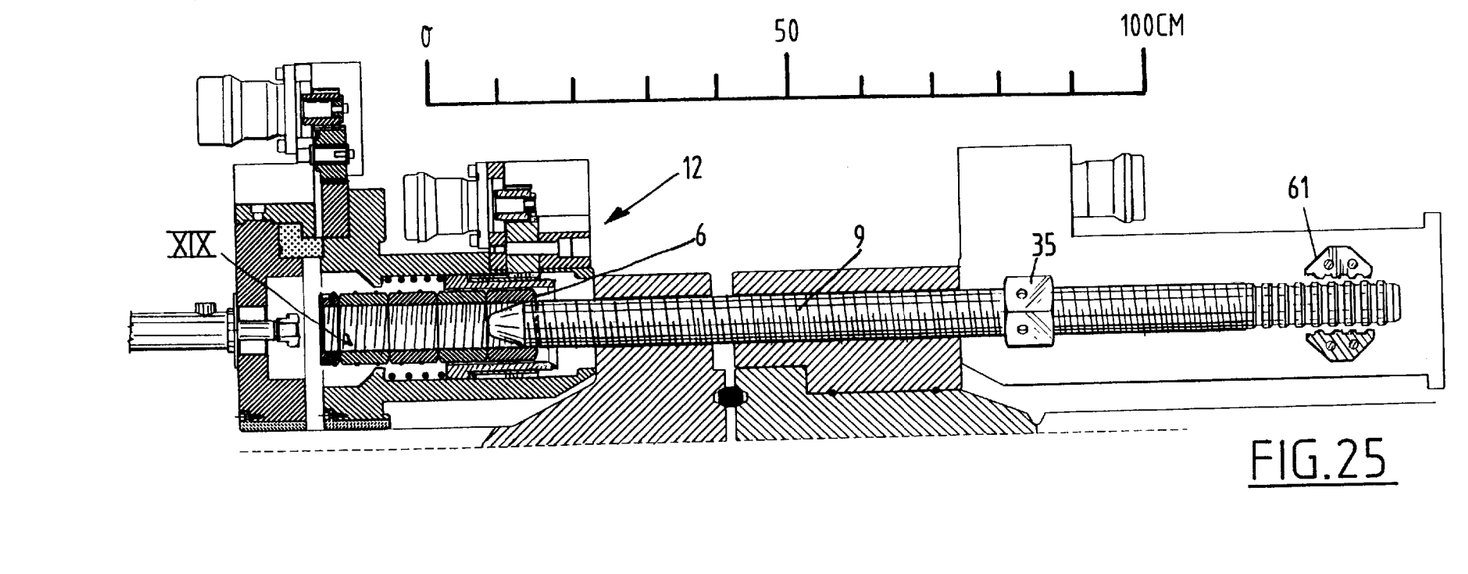
FIG. 25 shows a section corresponding with FIG. 20 relating to a preferred embodiment of the apparatus according to the invention.

A nut wrench 12 as shown in FIGS. 21–23 of the drawings can be used as an alternate embodiment of the invention to connect or disconnect the pipe pieces. The wrench frame 13 thereof is placed on a pipe piece 100 by means of two saddles 14 and 15 which can each be clamped fixedly to pipe piece 100 by means of a hydraulically operated transverse pin 16 respectively 17. By fixedly clamping the saddle 14 displaceable relative to wrench frame 13 to pipe piece 100, the wrench frame 13 can be displaced relative to saddle 14 and, conversely, in the case of a fixedly clamped saddle 15 the saddle 14 is forward displaceable in order to perform the required step movements. (Wrench frame 14 of FIG. 12 is also displaceable in the same manner).

The zero position of the angular displacement can be realized by means of a V-shaped angle section 22 which co-acts with a pin 23 welded to pipe piece 100. Because the weight of nut wrench 12 is compensated by a floater body 24, nut wrench 12 can be swivelled slightly relative to pipe piece 100 by means of the ROV.

A tool head 18 can be set in the required angular position by means of a ring bearing 25 mounted thereon, a gear ring 19 and a driving gear 20, wherein a plurality of, for instance four, nut wrenches 21 lie in line with bolt holes 8.

Each wrench 21 comprises a housing 26 and a nut magazine 27 mounted rotatably and a slidably therein and urged toward flange 102 by a spring 28, which magazine is adapted to receive a plurality of, for instance four, nuts 6 (FIGS. 18, 19) and has for this purpose a hexagonal internal profile. Nut magazine 27 is driven via its gear ring 29 and a driving gear 31.

Hydraulic motors are present for the diverse drives.

Nut magazine 27 contains a push member 41 which is provided with three L-shaped leaf springs 42 which in the return direction act as pins, in addition to a rubber friction ring 43. When tool head 18 is in its starting position, the saddle 15 has axially in line with nut magazine 27 a pusher 44 which in each case is driven by a cylinder 45 and which shifts by one nut width at a time the push member 41 and the nuts 6 which are present.

In combination with this wrench 21 a wrench 46 is used in each case which is identical to wrench 30, except that the now superfluous fixed ring 63 is preferably omitted. Bolts 9 are inserted into holes 8, a nut 6 is screwed on in each case, a nut 35 is screwed in each case against a flange 102, bolts 9 are tightened by energizing cylinder 72 and nut 35 is screwed further to flange 102, all of this while the bolts 9 in question are held fast by means of clamps 64. Clamps 64 are thereafter released to remove wrenches 126 from bolts 9.

Wrenches 126 are once again filled with bolts 9 by means of the ROV and these are inserted into other holes 8 when wrenches 126 are swivelled through an angle, whereafter nuts 6 from nut wrenches 21 are screwed thereon from the other side.

In order to hold nuts 6 positioned in their compartment, instead of friction rings 120 on the nuts 6 rubber strips can be arranged on the inner walls of nut compartments 5, for instance in the middle of the hexagons in axial direction of nuts 6, which strips bring about a considerable friction between nuts 6 and the inner walls of compartments 5.

If only one nut and bolt connection has to be made, for instance because a bolt 9 must be replaced, the same wrench 3 can be used, wherein only one of the wrenches 6 is then driven. Control and driving of each wrench is dependent on the others for this purpose.

What is claimed is:

1. Apparatus for underwater connection with nut and bolt connections of two pipe pieces, the pipe pieces having flanges with bolt holes in the flanges, the apparatus comprising a frame and a bolt wrench having a plurality of wrenches mounted on said frame, wherein each of said wrenches has an opening for receiving a bolt which is bounded by a socket, the socket being driven by drive means and by a clamp, the opening and closing of said clamp being energized by tensioning means.

2. The apparatus of claim 1 wherein each said wrench has a housing and said opening is bounded by a ring which is fixedly connected to said housing of said wrench, said ring forming a stop for at least one pin which is received slidably in said ring of said bolt for mounting.

3. The apparatus of claim 1 which includes a nut wrench for fastening or releasing the nut of a nut and bolt combination, said nut wrench having at least one nut magazine compartment which is adapted to receive a plurality of nuts.

4. The apparatus of claim 3 which includes friction means acting between said at least one magazine compartment and a nut received therein, and spring means acting against said nut which urges said nut outward of said magazine compartment.

5. The apparatus of claim 1 wherein said bolt of each nut and bolt combination is provided with a ring which is fixedly mounted thereon and in which at least one pin which is longer than the axial length of said ring is arranged in a continuous hole, said pin is provided with a shoulder which co-acts on its one side with a spring and co-acts on its other side with a stop.

6. Apparatus for underwater connection with nut and bolt connections of two pipe pieces, the pipe pieces having flanges with bolt holes in the flanges, the apparatus comprising a frame and a bolt wrench having a plurality of wrenches mounted on said frame, wherein each of said wrenches has a an opening for receiving a bolt which is bounded by a socket, the socket driven by drive means and by a clamp, the opening and closing of said clamp being energized by tensioning means, and at least one wrench having a frame with two supports spaced at a mutual axial distance on one pipe piece, said supports are each provided with holding means for fixedly holding said supports on the pipe piece, wherein at least one of said supports is displaceable relative to said frame and said supports are mutually connected by hydraulically driven means.

* * * * *